United States Patent
Lee et al.

(10) Patent No.: US 7,355,935 B2
(45) Date of Patent: Apr. 8, 2008

(54) METHOD OF RECORDING PHYSICAL ADDRESS INFORMATION ON OPTICAL DISC AND OPTICAL DISC HAVING THE SAME

(75) Inventors: Seung-min Lee, Suwon-si (KR); Sung-hee Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 673 days.

(21) Appl. No.: 10/883,981

(22) Filed: Jul. 6, 2004

(65) Prior Publication Data

US 2005/0030854 A1    Feb. 10, 2005

(30) Foreign Application Priority Data

Jul. 8, 2003    (KR) .................... 10-2003-0046209

(51) Int. Cl.
*G11B 15/52*    (2006.01)
(52) U.S. Cl. .................. 369/47.15; 369/59.26
(58) Field of Classification Search ............ None
See application file for complete search history.

(56) References Cited

U.S. PATENT DOCUMENTS

| | | | |
|---|---|---|---|
| 6,751,173 | B1 | 6/2004 | Maeda |
| 6,757,239 | B2 | 6/2004 | Minamino et al. |
| 2003/0165095 | A1 | 9/2003 | Iimura et al. |
| 2004/0156294 | A1 | 8/2004 | Watanabe et al. |
| 2005/0031319 | A1* | 2/2005 | Fujita et al. ............... 386/125 |
| 2005/0229082 | A1* | 10/2005 | Kawamae et al. .......... 714/769 |

FOREIGN PATENT DOCUMENTS

| | | |
|---|---|---|
| EP | 1 024 495 | 8/2000 |
| JP | 2000-311353 | 11/2000 |
| JP | 2001-167445 | 6/2001 |
| JP | 2002-342941 | 11/2002 |
| KR | 2003-28353 | 4/2003 |
| WO | WO 02/21518 | 3/2002 |
| WO | WO 02/073607 | 9/2002 |
| WO | WO 02/086873 | 10/2002 |
| WO | WO 03/034414 | 4/2003 |

* cited by examiner

*Primary Examiner*—Paul W. Huber
(74) *Attorney, Agent, or Firm*—Stein, McEwen & Bui, LLP

(57) ABSTRACT

An optical disc and method of recording physical address information on the optical disc, the optical disc including a first recording area ranging from an innermost circumference to a predetermined position, and a second recording area ranging from the predetermined position to an outermost circumference. Data is recorded in the first recording area in units of first recording blocks shorter than a predetermined track in the first recording area and is recorded in the second recording area in units of second recording blocks longer than the first recording blocks. First format address information indicating physical address information of a first recording block is recorded in the first recording area and second format address information indicating physical address information of a second recording block is recorded in the second recording area.

25 Claims, 5 Drawing Sheets

METHOD OF RECORDING PHYSICAL ADDRESS INFORMATION ON OPTICAL DISC AND OPTICAL DISC HAVING THE SAME

CROSS-REFERENCE TO RELATED APPLICATION

This application claims the priority of Korean Patent Application No. 2003-46209, filed on Jul. 8, 2003 in the Korean Intellectual Property Office, the disclosure of which is incorporated herein in its entirety by reference.

BACKGROUND OF THE INVENTION

1. Field of the Invention

The present invention relates to an optical disc, and more particularly, to a method of recording physical address information on an optical disc and an optical disc having physical address information.

2. Description of the Related Art

Generally, when recording data on an optical disc, a basic recording unit having a fixed size is used throughout the optical disc and is referred to as a recording block or an error correction code (ECC) block. When a single recording block is recorded on the optical disc, a recording physical address indicating a position of the recording block on the optical disc is also recorded. All physical recording addresses are recorded throughout the optical disc and have the same size and structure.

A conventional method of recording address information indicating an address of a recording block on an optical disc may include generating a wobble signal by performing wobble modulation on the address information and making a track of the optical disc have the same shape as the wobble signal.

FIG. 1 illustrates a disc track having the same shape as a wobble signal indicating physical address information.

Wobble modulation methods include monotone wobble (MW) modulation, saw tooth wobble (STW) modulation, binary phase shift keying (BPSK) modulation, frequency shift keying (FSK) modulation, and minimum shift keying (MSK) modulation. Since wobble modulation on address information is advantageous for improving optical disc access characteristics such as motor speed control, the method is widely used for recording address information of a recording block on an optical disc.

In addition to the address information, other kinds of information, such as a type and properties of the optical disc, may be included in a wobble. Throughout the optical disc, only a single type of wobble is used and recording addresses have the same structure when the recording address information is included in the wobble.

Referring to FIG. 1, the track has the same shape as a wobble signal generated according to MW modulation in which the address information is modulated into single-frequency sine waves. A mark corresponding to recording data is formed in the middle of the track. As shown in FIG. 1, the wobble signal shaped on the track and indicating an address of a single recording block has the same length as the single recording block.

FIG. 2 illustrates a wobble signal generated using a conventional phase-shift keying (PSK) modulation. The wobble signal shown in FIG. 2 corresponds to 10 periods of a basic wobble signal. In FIG. 2, a curved line in an upper portion represents a wobble signal shaped on a track, and a square line in a lower portion represents square waves generated by processing the wobble signal, which has been read by a pickup of an optical disc drive, using a predetermined method.

The square waves shown in FIG. 2 indicate data values 0, 1, 0, 0, 0, 0, 1, 1, 0, and 0 included in the wobble signal corresponding to 10 periods of the basic wobble signal. A wobble signal corresponding to 83 periods of the basic wobble signal having a data value of "0" is recorded in front of the wobble signal corresponding to the 10 periods of the basic wobble signal. A wobble signal corresponding to the 93 periods of the basic wobble signal indicates a single address information bit value of "1". A recording address of a single recording block is expressed using a total of 52 bits.

FIG. 3 illustrates a wobble signal generated using a conventional MSK modulation. The wobble signal corresponds to 8 periods of the basic wobble signal.

Wobbles corresponding to a single period of the basic wobble signal have different frequencies of "f" and "1.5f". According to the conventional MSK modulation, a single address information bit is expressed by a wobble signal corresponding to 56 periods of the basic wobble signal. A value of the single address information bit is determined by a position of three consecutive wobbles sequentially having frequencies of 1.5f, f, and 1.5f, respectively, in the wobble signal corresponding to 56 periods of the basic wobble signal. According to the conventional MSK modulation illustrated in FIG. 3, a total of 83 bits express a recording address of a single recording block.

FIG. 4 illustrates an example of a conventional method of recording a physical address on an optical disc using a land-pre pit (LPP). When the optical disc includes a land track and a groove track, data such as user data is recorded on the groove track and pits indicating a corresponding physical address are formed on the land track.

Referring to FIG. 4, a data value is determined by the existence or non-existence of a pit at a peak of a monotone wobble formed along the land track. In other words, when a pit is formed on the land track, a data value is "1". When a pit is not formed on the land track, a data value is "0". When 208 such data values are obtained, 12 address information bits are expressed. 192 address information bits express an address of a single recording block.

Recently, an attempt has been made to use an optical disc as an information storage medium for a portable electronic apparatus, e.g., a camcorder, recording and/or reproducing audio information and video information together. However, it is problematic to use a conventional optical disc in a portable electronic apparatus. For example, a conventional optical disc having a size of 80 mm or 120 mm is too big to be used as an information storage medium for a camcorder and also requires a large amount of power.

To use an optical disc as an information storage medium for a portable electronic apparatus, such as a camcorder or a digital camera, a compact optical disc having a smaller size and a higher data recording density than the conventional optical disc is desired. However, when data is recorded on the compact optical disc using a conventional recording block (or ECC block), problems may occur in an inner radius area of the compact optical disc.

FIG. 5 illustrates an innermost circumference area of a compact optical disc on which data is recorded in units of conventional recording blocks. Referring to FIG. 5, when data is recorded in units of conventional 64-Kbyte recording blocks in a data recording area at the innermost circumference having a radius of 6 mm on the compact optical disc in a direction from an inner radius to an outer radius, a single conventional recording block occupies a region from point A to point D. In other words, the single conventional recording block occupies two tracks, having an overlap in a radial direction of the compact optical disc. When a defect occurs in the radial overlap of the recording block due to a scratch, dust, or a fingerprint, the defect is more severe than a defect occurring in a non-overlap portion of the recording block. As a result, error correction performance may be remarkably decreased, thereby deteriorating the reliability of the reproduced data.

To prevent a radial overlap from occurring in a recording block, different formats of recording blocks may be used. In detail, data is recorded in an inner circumference area on a compact optical disc in units of first recording blocks which are shorter than a predetermined track at an inner circumference of the compact optical disc, and is recorded in other areas on the compact optical disc in units of second recording blocks that are longer than the first recording blocks. The second recording blocks that are longer than the first recording blocks are used because bigger recording blocks are more advantageous in terms of error correction.

However, when different formats of recording blocks exist in a data recording area, an address of a recording block cannot be recorded on a compact optical disc. This is because, according to the conventional technology illustrated in FIG. 1, the length of the address information indicating an address of a single recording block is the same as the physical length of the recording block, and a single address recording method and a single address information system are used throughout the compact optical disc. Accordingly, a new address recording method is desired.

Meanwhile, a problem of a radial overlap in a recording block occurs in a smaller radius, e.g., of about 6 mm, than an inner radius of a conventional compact optical disc as well as in an inner circumference area of the conventional compact optical disc.

SUMMARY OF THE INVENTION

According to an aspect of the present invention, an optical disc allowing address information of recording blocks to be recorded thereto such that data can be recorded on the optical disc using different formats of recording blocks is provided.

According to an aspect of the present invention, a method of recording address information of recording blocks on an optical disc such that data can be recorded on the optical disc using different formats of recording blocks is also provided.

According to an aspect of the present invention, there is provided an optical disc including a first recording area ranging from an innermost circumference to a predetermined position, and a second recording area ranging from the predetermined position to an outermost circumference. Here, data is recorded in the first recording area in units of first recording blocks shorter than a predetermined track in the first recording area and is recorded in the second recording area in units of second recording blocks longer than the first recording blocks. First format address information indicating physical address information of a first recording block is recorded in the first recording area and second format address information indicating physical address information of a second recording block is recorded in the second recording area.

According to another aspect of the present invention, there is provided a method of recording physical address information on an optical disc including a first recording area and a second recording area wherein data is recorded in the first recording area in units of first recording blocks shorter than a predetermined track in the first recording area and is recorded in the second recording area in units of second recording blocks longer than the first recording blocks. The method includes recording first format address information indicating physical address information of a first recording block on the optical disc, wherein the first format address information has the same length as the first recording block; and recording second format address information indicating physical address information of a second recording block on the optical disc, wherein the second format address information has a same length as the second recording block.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
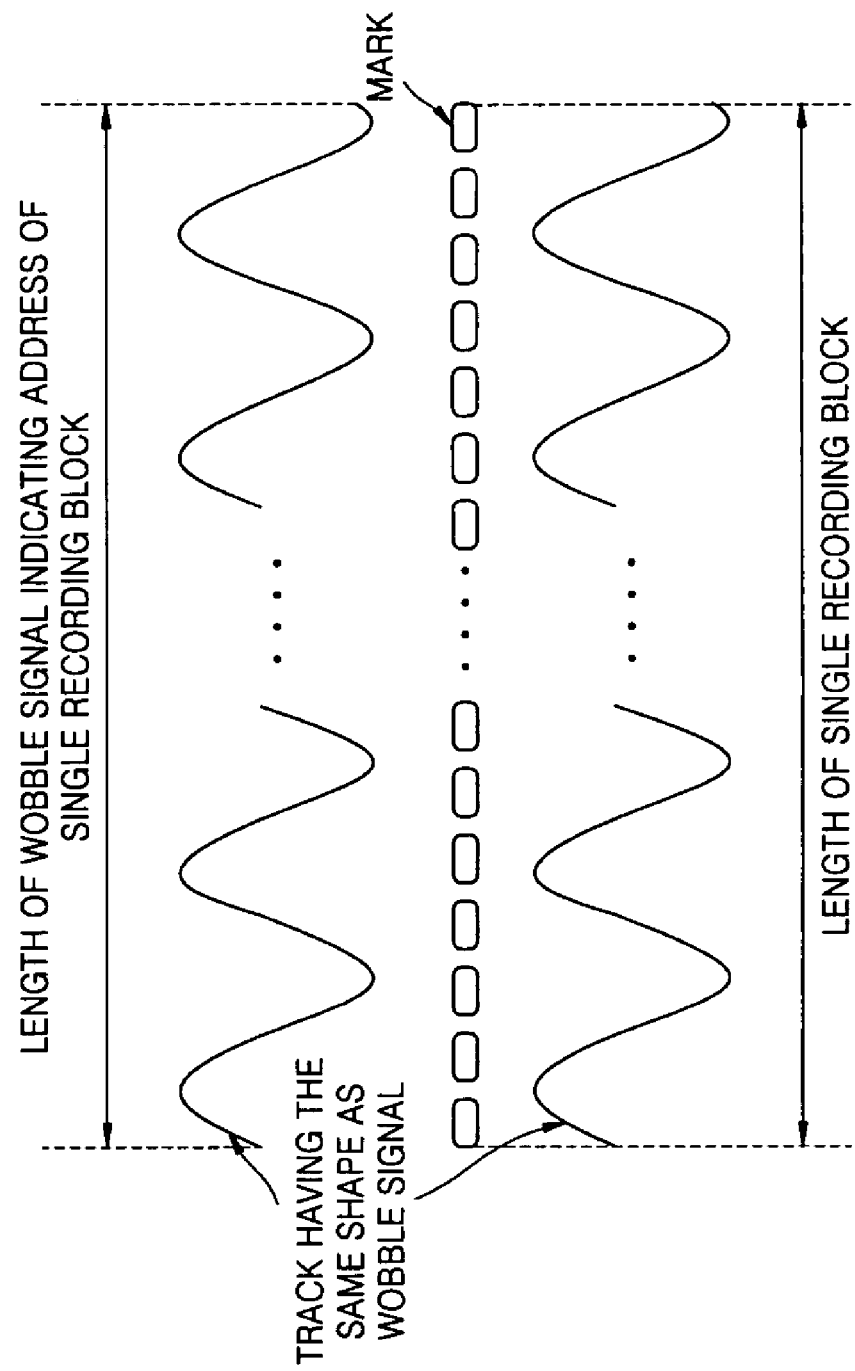
FIG. 1 illustrates a conventional disc track having the same shape as a wobble signal indicating physical address information.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 6:
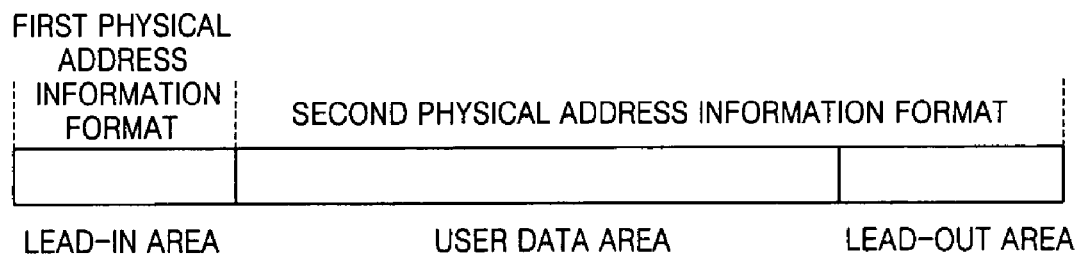
FIG. 6 illustrates a structure of an optical disc according to an embodiment of the present invention.

Referring to FIG. 6, an optical disc according to an embodiment of the present invention includes a lead-in area, a user data area, and a lead-out area arranged sequentially. To prevent a radial overlap from occurring in a recording block, data is recorded in the lead-in area in units of first recording blocks and is recorded in other areas (, i.e., the user data area and the lead-out area) in units of second recording blocks that are longer than the first recording blocks. An area on the optical disc in which data is recorded in units of first recording blocks is referred to as a first recording area, and an area on the optical disc in which data is recorded in units of second recording blocks is referred to as a second recording area.

Address information is recorded in the first recording area (i.e., the lead-in area) according to a first physical address information format for the first recording blocks while address information is recorded in the second recording area (i.e., the user data area and the lead-out area) according to a second physical address information format for the second recording blocks.

In aspects of the present invention, two formats of recording blocks, (i.e., a first recording block and a second recording block) are used in recording data on an optical disc, but it is understood that more than two formats of recording blocks may be used. In addition, the first recording area and the second recording area are defined by a border between the lead-in area and the user data area, but is not intended to be limited thereto. For example, the first and second recording areas may be defined by another appropriate portion on the optical disc.

Figure 7A:
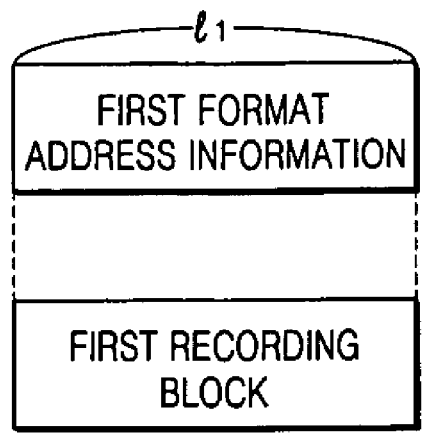
FIGS. 7A and 7B illustrate address information corresponding to a first recording block and address information corresponding to a second recording block, respectively.
Figure 7B:
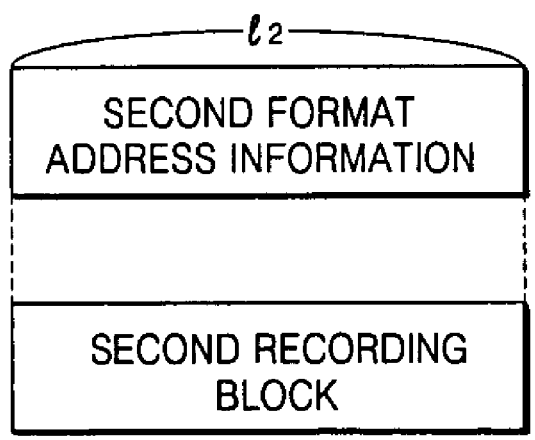

FIGS. 7A and 7B illustrate address information corresponding to a first recording block and address information corresponding to a second recording block, respectively. Referring to FIG. 7A, the first format address information corresponding to the first recording block is recorded in accordance with a length $l_1$ of the first recording block. Referring to FIG. 7B, the second format address information corresponding to the second recording block is recorded in accordance with a length $l_2$ of the second recording block. The length $l_1$ of the first format address information corresponding to the first recording block is less than the length $l_2$ of the second format address information corresponding to the second recording block.

A method of recording the first format address information and the second format address information as shown in FIGS. 7A and 7B may be embodied in various ways. An aspect where the physical address information is recorded using a wobble will be described below. Hereinafter, same wobbles provide the same amount of information during the same wobble period, and different wobbles provide different amounts of information during the same wobble period.

Figure 2:
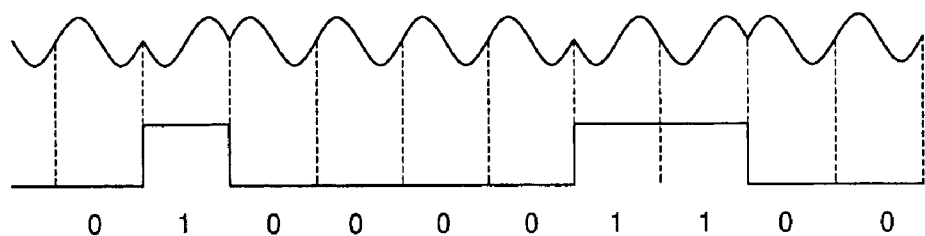
FIG. 2 illustrates a wobble signal generated using a conventional phase-shift keying (PSK) modulation.
Figure 3:
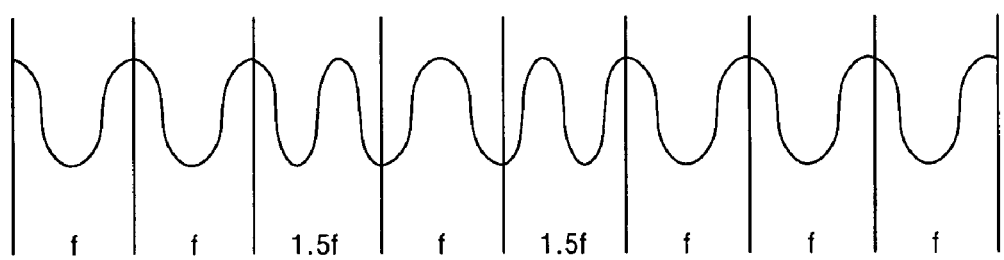
FIG. 3 illustrates a wobble signal generated using a conventional minimum shift keying (MSK) modulation.

In an embodiment of the present invention, the first format address information and the second format address information are recorded on an optical disc using different wobbles, and the amount of the first format address information is the same as the amount of the second format address information. For example, regarding the wobble signal shown in FIG. 2, a wobble corresponding to 93 periods of the basic wobble signal expresses a single address information bit value of "1", and a total of 52 bits express the recording address of a single recording block. Such wobble is used to record the second format address information, and a wobble corresponding to a smaller number of periods than the 93 periods of the basic wobble signal is used to express a single bit value for the first format address information. In other words, the amount of the first format address information that is shorter than the second format address information can be the same as the amount of the second format address information by increasing a recording density when recording the first format address information.

In another aspect of the present invention, the same wobbles are used to record the first format address information and the second format address information, and the length of the second format address information is fit to the physical length $l_1$ of the first format address information. No address information or additional information (e.g., a type of optical disc and properties such as recording power, existence or non-existence of copy protection, etc.) of the optical disc, is recorded in an empty space in an area assigned for recording of the second format address information on the optical disc.

In another aspect of the present invention, different physical address information structures may be used regardless of wobbles so as to provide different amounts of address information. In other words, considering that the physical length $l_1$ of the first format address information is less than the physical length $l_2$ of the second format address information, the amount of the first format address information is set to be less than the amount of the second format address information. For example, the first format address information may be structured to include 3-bytes of address information, 1-byte of additional information, and a 1-byte parity while the second format address information may be structured to include 4-bytes of address information, 3-bytes of additional information, and a 3-byte parity.

Figure 4:
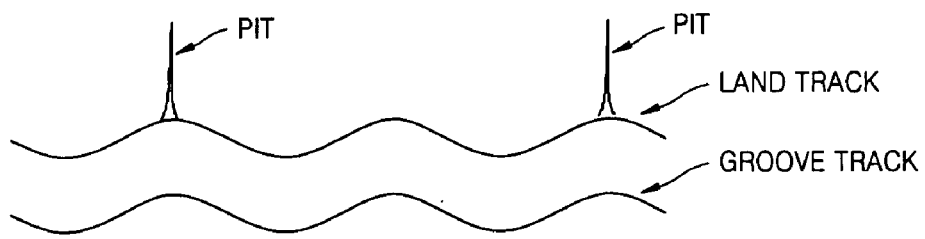
FIG. 4 illustrates an example of a conventional method of recording a physical address on an optical disc using a land-pre pit (LPP)
Figure 5:
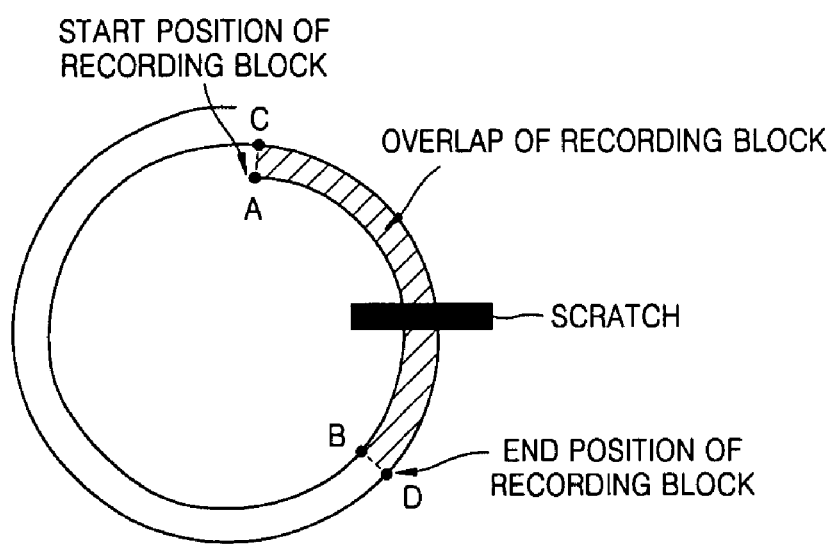
FIG. 5 illustrates an innermost circumference area of a compact optical disc on which data is recorded in units of conventional recording blocks.

Meanwhile, the physical address information may be recorded using a land-pre pit (LPP) as shown in FIG. 4. In an aspect of the present invention, the number of data values expressed by pits indicating a single physical address information bit value is changed so that the amount of the first format address information is the same as that of the second format address information. According to the method illustrated in FIG. 4, a data value is determined by existence or non-existence of a pit at a peak of a monotone wobble formed along a land track of an optical disc, and 208 data values express 12-bit address information. When the second format address information of an aspect of the present invention is recorded using the method illustrated in FIG. 4, the first format address information may be recorded by designing less than 208 data values to express 12-bit address information. In the embodiment of the present invention, LPPs are used, that is, physical address information is recorded on a land track of an optical disc. However, aspects of the present invention are not restricted thereto. For example, groove-pre pits (GPPs) may be used, that is, physical address information may be recorded on a groove track of an optical disc.

In another embodiment of the present invention, the first format address information and the second format address information may be recorded in different structures by forming and not forming pits in land tracks on an optical disc. In other words, considering that the physical length $l_1$ of the first format address information is less than the physical length $l_2$ of the second format address information, the amount of the first format address information is set to be less than the amount of the second format address information. For example, the first format address information may be structured to include 3-bytes of address information, 1-byte of additional information, and a 1-byte parity while the second format address information may be structured to include 4-bytes of address information, 3-bytes of additional information, and a 3-byte parity.

In another embodiment, when two or more different structures having wobbles providing different information amounts are used to record physical address information on an optical disc, information identifying a structure of physical address information may be additionally recorded on the optical disc. The optical discs may be a CD-R, CD-ROM, DVD, Blu-ray, Advanced Optical Disc (AOD), etc.

Figure 8:
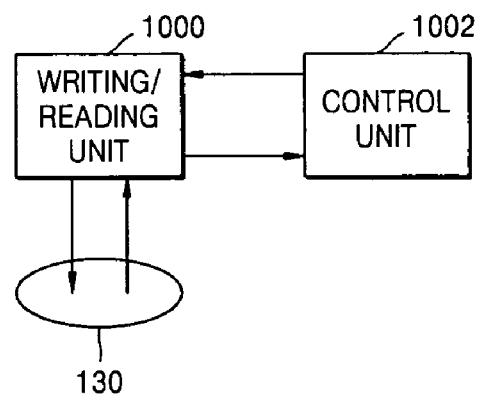
FIG. 8 is a block diagram of a recording and/or reproducing apparatus according to an embodiment of the present invention.

FIG. 8 is a block diagram of an optical recording and/or reproducing apparatus according to an embodiment of the present invention in which the recording block and address information of the information storage media of FIGS. 6, 7A and 7B are implemented. Referring to FIG. 8, the recording and/or reproducing apparatus includes a writing/reading unit 1000 and a control unit 1002. The writing/reading unit 1000 reads from and writes to the information storage medium 130 according to commands from the control unit 1002. Here, the information storage medium 130 includes several embodiments shown in FIGS. 6, 7A and 7B and the control unit 1002 controls data writing/reading operations of the writing/reading unit 1000 in order to prevent radial overlap of a first recording block having recorded address information in the inner tracks.

Referring to FIG. 8, according to the control of the control unit 1002, the writing/reading unit 1000 records data on a disc 130, which is an information storage medium according to embodiments of the present invention, and reads out data in order to reproduce recorded data. The control unit 1002 controls the writing/reading unit 1000 so that the writing/reading unit 1000 records data in first and second recording unit blocks having different lengths, or processes data read by the writing/reading unit 1000 and obtains valid data.

Reproducing refers to obtaining valid data by performing error correction for the read data, and is performed in predetermined units. The units for performing reproduction are referred to as reproducing unit blocks. A reproducing unit block corresponds to at least one recording unit block.

Figure 9:
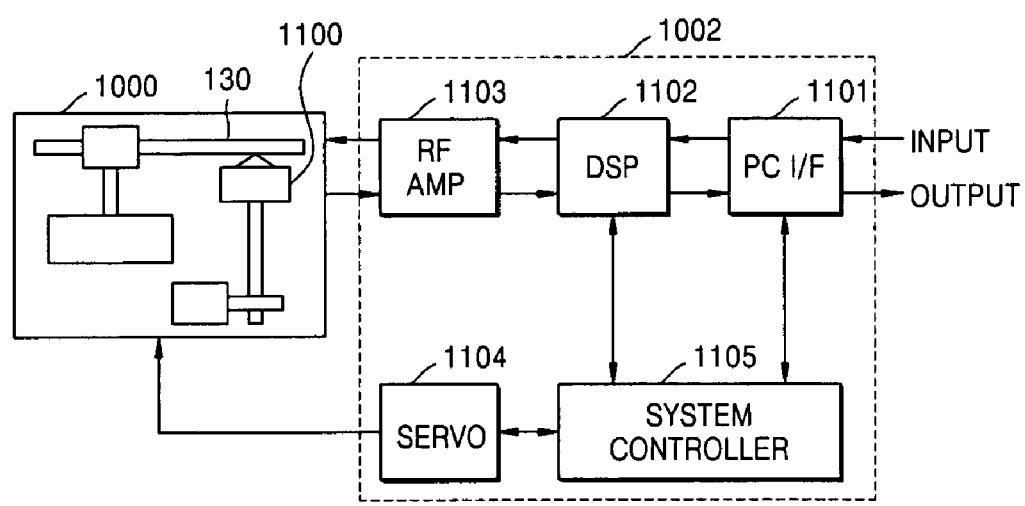
FIG. 9 is a more detailed block diagram of the optical recording and/or reproducing apparatus of FIG. 8.

FIG. 9 is a more detailed block diagram of the optical recording and/or reproducing apparatus of FIG. 8. Referring to FIG. 9, the information storage medium 130 is loaded in the writing/reading unit 1000. The recording and/or reproducing apparatus further includes an optical pickup 1100 that reads from and writes to the information storage medium 130. The control unit 1002 includes a PC I/F 1101, a DSP 1102, an RF AMP 1103, a servo 1104, and a system controller 1105, all of which constitute the control unit 1002 of FIG. 8.

In the data recording operation, the PC I/F 1101 receives a recording command with data to be recorded from a host. The DSP 1102 adds additional data such as a parity for error correction of the data received from the PC I/F 1101 and performs error correction and checking (ECC) encoding to generate an ECC block, which is an error correction block, and modulates the ECC block according to a predetermined method. The RF AMP 1103 converts the data output from the DSP 1102 into an RF signal. The optical pickup 1100 records the RF signal output from the RF AMP 1103 on the disc 130 in first and second recording blocks as shown in FIGS. 7A and 7B. The servo 1104 receives a command required for servo control from the system controller 1105 and servo-controls the optical pickup 1100.

In the data reproducing operation, the PC I/F 1101 receives a reproduction command from a host (not shown). The system controller 1105 performs the initialization required for reproduction. The optical pickup 1100 emits a laser beam onto the disc 130, obtains an optical signal by receiving a reflected beam from the disc 130, and outputs the optical signal. The RF AMP 1103 converts the optical signal output from the optical pickup 1100 into an RF signal and provides modulated data obtained from the RF signal to the DSP 1102 while providing a servo signal for control of the optical pickup 1100 obtained from the RF signal to the servo 1104. The DSP 1102 demodulates the modulated data, performs error correction and outputs the resulting data.

Meanwhile, the servo 1104 performs servo control of the optical pickup 1100, by using the servo signal received from the RF AMP 1103 and a command required for servo control received from the system controller 1105. The PC I/F 1101 transfers the data received from the DSP 1102 to the host.

As described above, according to embodiments of the present invention, different formats of recording blocks are used and different formats of physical address information corresponding to the different formats of recording blocks are recorded on an optical disc to prevent a radial overlap from occurring in the recording block when data is recorded on the optical disc. Accordingly, a recording position of each recording block can be effectively expressed on the optical disc.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical disc for use in a recording and/or reproducing apparatus, comprising:
    a first recording area ranging from an innermost circumference to a predetermined position; and
    a second recording area ranging from the predetermined position to an outermost circumference, wherein:
        data is recorded by the apparatus in the first recording area in units of first recording blocks shorter than a predetermined track in the first recording area and is recorded by the apparatus in the second recording area in units of second recording blocks longer than the first recording blocks,
        first format address information indicating physical address information of the first recording blocks is recorded by the apparatus in the first recording area, and
        second format address information indicating physical address information of the second recording blocks is recorded differently from the address information by the apparatus in the second recording area.

2. The optical disc of claim 1, wherein the first format address information and second format address information are recorded using different wobbles, respectively.

3. The optical disc of claim 1, wherein the first format address information and the second format address information are recorded with same information amounts using same wobbles, and additional information is recorded in an empty space in an area assigned for the second format address information on the optical disc.

4. The optical disc of claim 1, wherein the first format address information and the second format address information each have different structures.

5. The optical disc of claim 1, wherein the first recording area is a lead-in area, and the second recording area is a remaining area other than the lead-in area on the optical disc.

6. A method of recording physical address information on an optical disc including a first recording area and a second recording area wherein data is recorded in the first recording area in units of first recording blocks shorter than a predetermined track in the first recording area and is recorded in the second recording area in units of second recording blocks longer than the first recording blocks, the method comprising:
    recording first format address information indicating first physical address information of a first recording block on the optical disc, the first format address information having a same length as the first recording block; and
    recording second format address information indicating second physical address information of a second recording block on the optical disc, the second format address information having a same length as the second recording block.

7. The method of claim 6, wherein the first format address information and the second format address information are recorded on the optical disc using different wobbles, respectively.

8. The method of claim 6, wherein the first format address information and the second format address information are recorded with same information amounts using same wobbles, and additional information is recorded in an empty space in an area assigned for the second format address information on the optical disc.

9. The method of claim 6, wherein the first format address information and the second format address information each have different structures.

10. The method of claim 6, wherein the first recording area is a lead-in area, and the second recording area is a remaining area other than the lead-in area on the optical disc.

11. An information storage medium for use with a recording and/or reproducing apparatus, comprising:

a first recording area which stores data recorded by the apparatus in first recording blocks and corresponding first address information of the first recording blocks; and a second recording area which stores the data recorded by the apparatus in second recording blocks and corresponding second address information of the second recording blocks, wherein the second recording blocks are larger than the first recording blocks, wherein the first address information and the first recording block are each a first length such that a radial overlap of the first recording block is prevented, and the second address information and the second recording block are each a second length.

12. The information storage medium of claim 11, wherein the first recording area and the second recording area are defined by a border between a lead-in area and a user data area.

13. The information storage medium of claim 11, wherein the information storage medium is a compact optical disc.

14. The information storage medium of claim 11, wherein the first length of the first recording block is less than the second length of the second recording block.

15. The information storage medium of claim 11, wherein the first address information is recorded by the apparatus using a first wobble in the first recording area and the second address information is recorded by the apparatus using a second wobble in the second recording area, and the first wobble comprises a smaller number of first wobble periods than a number of second wobble periods.

16. The information storage medium of claim 11, wherein the first address information is recorded by the apparatus using a wobble in the first recording area and the second address information is recorded by the apparatus using the wobble in the second recording area, and the apparatus records the second address information in the second recording area only in a length corresponding to the first recording block and a remaining portion of the second recording area corresponding to the second address information is recorded by the apparatus with null data or is empty.

17. The information storage medium of claim 11, wherein the first address information is recorded by the apparatus in a first structure and the second address information is recorded by the apparatus in a second structure, wherein the first structure corresponds to less data than the second structure.

18. The information storage medium of claim 17, wherein the apparatus uses wobble signals to record the first address information and the second address information.

19. The information storage medium of claim 17, wherein the apparatus uses a land-pre pit (LPP) to record the first address information and the second address information.

20. The information storage medium of claim 17, wherein the first structure comprises 3 bytes of address information, 1 byte of property information, and 1 byte of parity, and the second structure comprises 4 bytes of address information, 3 bytes of property information, and 3 bytes of parity.

21. A method of preventing a radial overlap in a first and/or second recording block on an information storage medium, comprising:

setting a first storage area by storing first address information corresponding to the first recording block according to a size of the information storage medium in the first storage area thereby preventing radial overlap of the first recording block on the information storage medium; and setting a second storage area by storing second address information corresponding to the second recording block, the second storage area disposed externally to the first storage area, wherein the second recording block is larger than the first recording block.

22. The method of claim 21, wherein the storing the second address information comprises adjusting an amount of the second address information stored such that the amount corresponds to a size of the first address information.

23. The method of claim 21, wherein the first address information and the second address information each have different structures.

24. The method of claim 21, wherein the setting the first storage area comprises setting the first storage area corresponding to a lead-in area of the information storage medium.

25. A recording and/or reproducing apparatus, comprising:

an optical pickup which records data on and/or reads the data from a surface of an information storage medium; and a controller which controls the optical pickup to record and/or reproduce the data on the surface of the information storage medium in first and second recording blocks and to set a first length of the first recording blocks and a second length of the second recording blocks, wherein the information storage medium comprises:

a first recording area which stores data recorded by the controller in the first recording blocks and corresponding first address information indicating physical address information of the first recording blocks, and a second recording area which stores the data recorded by the controller in the second recording blocks and corresponding second address information indicating physical address information of the second recording blocks, wherein the first address information indicating physical address information of the first recording blocks and the second address information indicating physical address information of the second recording blocks are recorded differently by the controller in the first and second recording areas of the information storage medium, and wherein the second length is greater than the first length, such that a radial overlap of the first recording blocks at an inner track of the information storage medium is prevented.

* * * * *

UNITED STATES PATENT AND TRADEMARK OFFICE
CERTIFICATE OF CORRECTION

PATENT NO. : 7,355,935 B2
APPLICATION NO. : 10/883981
DATED : April 8, 2008
INVENTOR(S) : Seung-min Lee et al.

It is certified that error appears in the above-identified patent and that said Letters Patent is hereby corrected as shown below:

Column 8, line 14, insert --first format-- before "address".

Signed and Sealed this

Fourteenth Day of October, 2008

JON W. DUDAS
*Director of the United States Patent and Trademark Office*